July 12, 1955  J. G. GOLSETH ET AL  2,712,975
ELECTRONIC DIAGNOSTIC INSTRUMENTS
Filed July 18, 1949
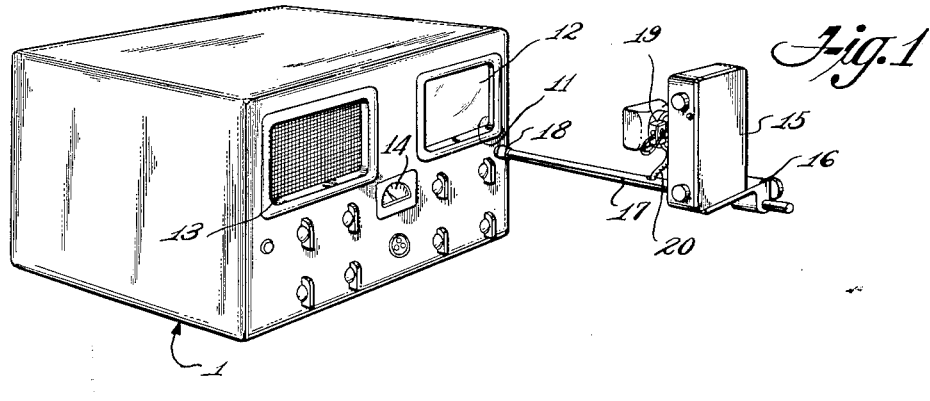
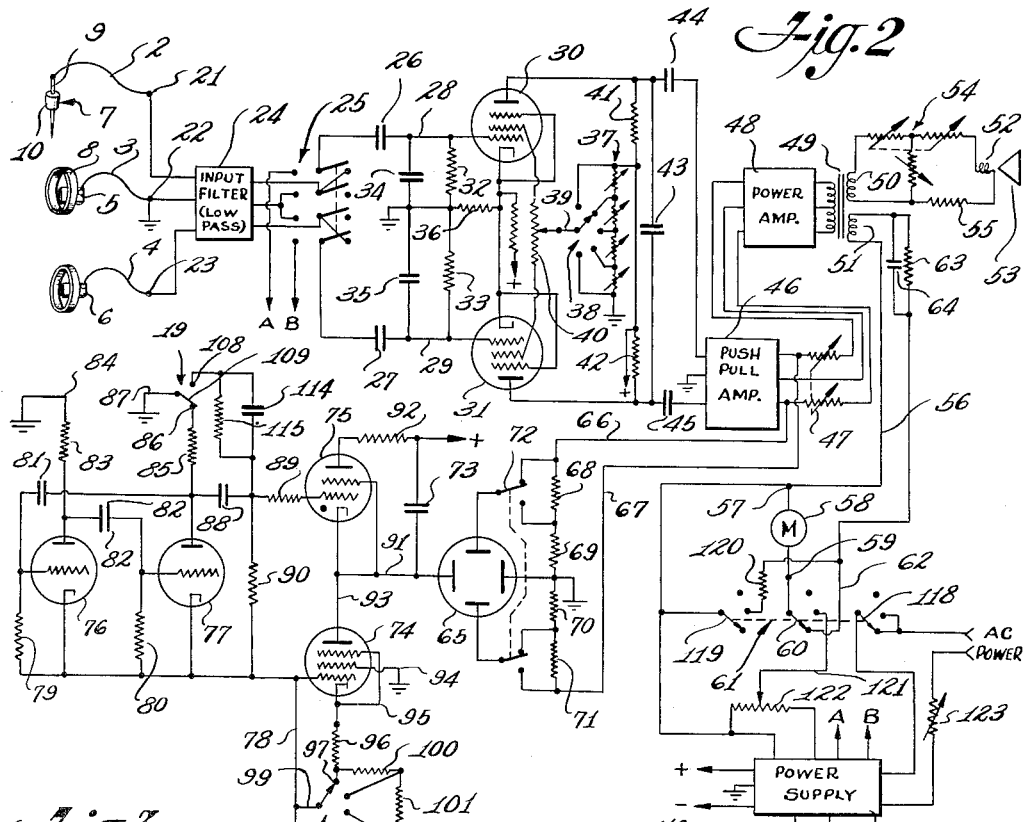
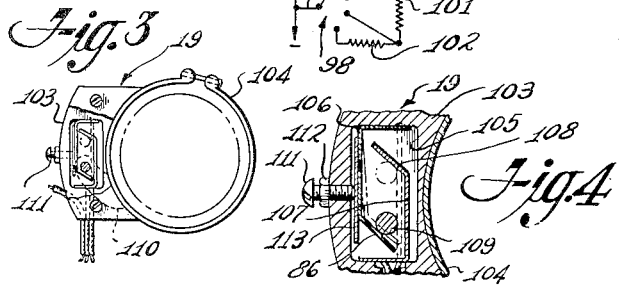
INVENTORS
JAMES G. GOLSETH
CHARLES C. LE GRAND
BY
Fulwider & Mattingly
Attorneys United States Patent Office 2,712,975
Patented July 12, 1955

2,712,975

ELECTRONIC DIAGNOSTIC INSTRUMENTS

James G. Golseth, Altadena, and Charles C. Le Grand, South Pasadena, Calif., assignors to The Meditron Company, Pasadena, Calif., a corporation of California Application July 18, 1949, Serial No. 105,412

3 Claims. (Cl. 346—33)

Our invention relates to electronic diagnostic instruments and has particular reference to an electromyograph adapted to indicate and record information relating to the condition of the nerves and muscles of patients suffering from injuries or certain diseases such as poliomyelitis. The invention has particular utility as a means for indicating to an attending physician the muscle development or tone and the condition of the nerves prior to and during treatment.

It is well known in the medical profession that the muscles of the body produce electrical potentials which, if properly measured and observed, advise the diagnosing or attending physician of the condition of the nerves and muscles. Various instruments have been devised prior to our invention for the purpose of measuring these minute electrical potentials but such prior machines have not been satisfactory, being bulky and cumbersome to handle and making it necessary for the patient to visit the physician's office for treatment and observation.

Another defect in the prior types of apparatus has been their relative inflexibility and their incapability of ready adjustment, particularly as regards the amplification of minute voltages which would otherwise remain undetected. Furthermore, the inherent noise level and the sensitivity of the prior devices to extraneous disturbances have so distorted the purported results of such mechanisms as to render the findings substantially useless.

It is therefore an object of our invention to provide an electromyograph of the character described which is relatively simple in its construction and which is so compact as to be readily portable.

It is also an object of our invention to provide a device of the character described wherein relatively great variations in amplification may be obtained without distortion which otherwise would render the indications of the instrument substantially useless.

It is a still further object of our invention to provide a device of the character described for the amplification of minute electrical potentials in which the electrical circuits are so accurately balanced that distortion, interference from extraneous sources, and internal noise are substantially eliminated and the resultant indication of the instrument is a true representation of the voltages developed within physiological tissue.

It is an additional object of our invention to provide a ready means for recording the readings of the instrument for a leisurely study by the examining physician and to provide a permanent record for future reference to permit the physician to determine the progress being made in the patient's response to treatment.

It is also an object of our invention to provide an electromyograph of the character set forth in the preceding paragraph in which the effective values of the detected potentials are indicated by a voltmeter and in which the wave form of the detected potentials is displayed on the screen of an oscilloscope.

It is a still further object of our invention to provide an apparatus of the character set forth hereinbefore in which the recording means comprises a photographic camera arranged to photograph the oscilloscope screen.

It is an additional object of our invention to provide an apparatus of the character hereinbefore mentioned which includes a novel sequence switch to insure having only one complete trace on the oscilloscope while the camera shutter is open.

It is also an object of our invention to provide, in an apparatus of the character set forth hereinbefore, a set of electrodes for application to a patient and for connection to the electromyograph apparatus.

Other objects and advantages of our invention will be apparent from a study of the following specifications, read in connection with the accompanying drawings, wherein:

Fig. 1 is a perspective view illustrating the general form and appearance of our instrument and showing a photographic recording device for recording the indications of the machine;

Fig. 2 is a schematic wiring diagram illustrating the electrical components and their manner of interconnection in accordance with the preferred form of our invention;

Fig. 3 is an elevational view of a camera shutter containing one embodiment of our sequence switch; and Fig. 4 is an enlarged fragmentary section of the switch shown in Fig. 3.

As will be fully understood by those familiar with this art, a complete analysis of the minute electrical potentials produced in the muscles is essential to providing the physician with sufficient information relating to the nerve condition and the tone of the muscles to determine whether the treatment given is producing desirable or undesirable results. The apparatus of our invention is accordingly arranged to provide three different types of indications relative to the detected electrical potentials; namely, an indication as by means of a voltmeter of the effective or root means square value of the detected potentials; an indication of the wave form of the detected potentials as by means of a suitable oscilloscope; and an audible presentation of the variations in the detected potentials as by applying amplified versions of those potentials to a loud speaker so that such variations are reproduced as sound. Furthermore, in order to provide a permanent record of the conditions observed, we provide a recording apparatus in the form of a photographic camera arranged to photograph the screen of the oscilloscope.

Referring to the drawings, we have illustrated the preferred form of our apparatus as comprising a housing or cabinet 1 within which are mounted the various electrical instrumentalities employed to detect and indicate the electrical potentials mentioned hereinbefore. Electrical connections between the apparatus contained within the housing 1 and the patient is effected by means of three flexible conductors, 2, 3, and 4 (see Fig. 2), to the patient end of which are connected a ground electrode 5, a surface electrode 6, and a probe or needle indicated generally at 7.

The ground electrode 5 preferably comprises a rectangular metal plate about one inch square and fitted with an elastic band 8 for securing the plate in contact with the skin of the patient at a location removed about 12 inches from the location of the muscle to be explored.

The surface electrode 6 is similarly constructed but is preferably made of somewhat smaller size. The surface electrode is ordinarily applied to the patient in close proximity to the location of the muscle to be explored.

The exploratory needle or electrode 7 preferably comprises a small diameter sharp pointed needle 9 which is inserted into and frictionally retained in an enlargement or socket member 10 which may conveniently comprise a small cork. We have found that for the needle 9, good results are obtained through the use of an ordinary sewing needle of small size, the flexible conductor 2 being attached to the eye of the needle 9.

We have found that it is essential to the proper detection of the potentials to be measured to insulate the needle 9 throughout its length, leaving only the extreme tip thereof uninsulated to pick up the electrical potentials generated within the muscle fibers. We have found that this insulation may be readily provided by first assembling the needle 9, cork 10, and conductor 3 in the manner shown in Fig. 2 and then by briefly immersing the assembly of needle and cork in an air setting liquid solution of an electrically non-conductive synthetic resin. The entire structure is thus covered with insulating material except for the extreme tip or sharp point of the needle 9 which the insulating material refuses to adhere to and cover by reason of the surface tension effects in the region of the extremely sharp point of the needle. After dipping, the insulating material is allowed to harden or set in the the usual fashion.

The synthetic resin solution may comprise any one of a number of available materials having the desired properties of being a non-conductor of electricity, non-toxic, tough, flexible, and capable of drying or setting after the immersion step. A preference is expressed for one of the polyvinyls marketed under the brand name of "Vinylite," such as vinyl acetate, vinyl chloride, or co-polymerized vinyl acetate and vinyl chloride. One may also use one of the polyacrylates such as is marketed under the brand name of "Lucite" and comprising methyl methacrylate.

In use, the needle 9 is inserted into the muscular fibers at a location and to a depth determined by the location of the muscular potentials which are to be applied to the electromyograph apparatus.

The housing 1 shown in Fig. 1 serves to house all of the electrical components of the amplifying and indicating apparatus and is provided with a window or opening 11 behind which is placed the screen 12 of an oscilloscope, preferably of the cathode ray tube type. A similar grilled opening 13 is provided for a loud speaker (not shown) to permit the sounds produced by the loud speaker to be readily heard by the diagnosing physician. A voltmeter 14 is also placed on the front panel of the housing 1 in a position to be readily observed.

The lower part of the front panel of the housing 1 carries a number of adjustment knobs, the purpose and function of which will appear in connection with the description of the wiring diagram shown in Fig. 2.

In addition to the apparatus thus far described, we provide a photographic camera 15 which is mounted as by means of an attaching device 16 to a tubular support 17 detachably affixed as by means of a connector 18 to the front panel of the housing 1.

The form and position of the support for the camera 15 is arranged to dispose the camera 15 in a position to photograph the screen 12 of the cathode ray tube.

As will be explained in more detail hereinafter, the camera 15 is provided with a sequence switch 19 which stops the beam from traversing screen 12 of the cathode ray tube, opens the camera shutter, and initiates a single sweep or trace on the screen 12.

The electrical connections for the sequence switch 19 may be in the form of shielded conductors 20 which are carried back to the housing 1 through the interior of the tubular support 17.

In Fig. 2 we have illustrated the electrical circuits employed to interconnect the various instrumentalities enclosed within the housing 1. As is shown in Fig. 2, the apparatus ends of the flexible leads 2, 3 and 4 are attached to input terminals 21, 22 and 23, the terminal 22 being grounded as shown. The signals picked up by the electrodes and thus applied to the terminals 21—23 are passed through an input filter 24 which preferably comprises a low pass filter having a cut off frequency of the order of magnitude of 3000 cycles. From the output of the filter 24 the signals are carried to a double throw switch indicated generally at 25 and arranged, when in the position shown in Fig. 2, to apply the signal on input terminal 21 to an upper input coupling condenser 26 and to apply the signal on input terminal 23 to a lower input coupling condenser 27. The condensers 26 and 27 are connected as by means of conductors 28 and 29 to the control grids of pentode type vacuum tubes 30 and 31. The control grids of these tubes are connected to ground through grid resistances 32 and 33. The resistances 32 and 33 are preferably by-passed by small condensers 34 and 35 serving to further attenuate high frequencies above about 3000 cycles.

The cathodes and suppressor grids of the tubes 30 and 31 are all interconnected and returned to ground through a cathode bias resistance 36 which is preferably not shunted by a by-pass condenser.

We have found that in the operation of the device of our invention it is essential to provide a means of controlling the overall gain of the amplifier and to provide for balancing the gain between the two channels of the push-pull system. Accordingly, we provide a voltage divider circuit, indicated generally at 37, comprising a group of variable resistances connected in series relationship between ground and a suitable source of positive operating potential such as a power supply unit 37a, connection to said power supply unit being represented in Fig. 2 by the arrowhead bearing the legend "+". It will be understood that this source of operating potential may comprise batteries or a rectifier type battery eliminator, or other well-known means as desired.

Connections are made between the individual terminals of a rotary switch 38 and points of interconnection between the series connected resistances forming the divider 37 so that by moving the switch arm of the switch 38 from one of its positions to another, one may select different values of direct operating potential. It will be appreciated that the magnitudes of these different values are individually adjustable through adjustment of the magnitude of the individual resistances forming the voltage divider.

The arm of the switch 38 is connected as by means of a conductor 39 to the movable contact of a potentiometer 40, the ends of the resistance strip of the potentiometer 40 being connected respectively to the screen grids of the vacuum tubes 30 and 31.

It will be seen that by operation of the tap switch 38, one may select the voltage to be applied to the screen grids of the vacuum tubes 30 and 31 to thereby control the gain and that through manipulation of the potentiometer 40 the voltages applied to the screen grids may be so balanced as to substantially cancel from the output any components of the voltage applied between terminals 21 and 22 which are in phase with voltage applied between terminals 22 and 23. The most common source of such in-phase signals is potentials induced in the leads 2 and 4 by electromagnetic induction from the ordinary commercial wiring in or near the building in which the apparatus is used.

Plate loads for the tubes 30 and 31 are provided by resistances 41 and 42 connected respectively to the plates of the tubes 30 and 31 and both connected as indicated in Fig. 2 to the positive terminal of the power supply unit 37a. The plates of the tubes 30 and 31 are also preferably interconnected by a small by-pass condenser 43 serving to further attenuate frequencies above about 3000 cycles.

The plates of the tubes 30 and 31 are coupled through coupling condensers 44 and 45 to the input of a push-pull amplifier indicated generally by the rectangle in Fig. 2 bearing the reference character 46. The output of the push-pull amplifier 46 is connected through a dual gain control rheostat 47 to the input of a power amplifier 48. The output of the power amplifier 48 is preferably applied to a coupling transformer 49 which provides separate and independent secondary windings 50 and 51.

The secondary winding 50 is preferably of the low impedance type, having an impedance of the order of magnitude of about six ohms. This winding is connected to the voice coil 52 of a dynamic loud speaker 53, there being interposed in the connecting circuit a T-pad type of attenuator indicated generally at 54, together with a series connected balancing resistance 55. With this structure it is possible to adjust at will the level of the sound produced by the loud speaker 53.

One terminal of the other secondary winding 51 is connected as by means of a conductor 56 to one terminal 57 of a voltmeter 58, the other terminal 59 thereof being connected to a switch arm 60 of a three pole three position switch indicated generally by the reference character 61. The switch 61 is so arranged that in its third or normal operating position as shown in Fig. 2, the switch arm 60 contacts a switch terminal from which is extended a conductor 62. The conductor 62 is connected to the other terminal of the secondary winding 51 through a compensating network comprising a series resistance 63 and a condenser 64 connected in shunt therewith.

We have found that in the interests of standardization of results, it is essential that the voltmeter 58 indicate the root mean square value of the potential detected by the exploratory electrodes. We have also found that because of the non-sinusoidal wave form of the detected potentials, it is difficult to provide a voltmeter having sufficient sensitivity while at the same time possessing sufficient overload capacity to withstand the high voltages produced by the transient nature and steep wave fronts of the amplified detected potentials. We have solved this problem by using a conventional movable iron vane type of alternating current voltmeter having a deflection-frequency characteristic, for voltmeter 58.

It will also be appreciated that the iron vane voltmeter which we have selected does not have a flat frequency response and is not ordinarily designed for operation at frequencies of the order of 2000 or 3000 cycles. We have, however, found that by proper adjustment of the magnitude of the resistance 63 and condenser 64, the normally non-linear response of the iron vane instrument with respect to variation in frequency may be so compensated as to provide a substantially flat frequency response. While the adjustment of the values of the resistance 63 and condenser 64 may be made only by a trial and error process, it is nevertheless possible to so adjust these values as to provide an instrument accuracy of the order of one or two percent.

With the apparatus thus far described, the electrical potentials picked up on the electrodes which are applied to the patient are filtered through the filter 24 and amplified by the amplifiers 30, 31 and 46. The output of the amplifier 46 amplified by the power amplifier 48 is applied to the loud speaker 53 and to the voltmeter 58 so that the root mean square value of the detected potentials may be measured and the wave form of the potentials generally observed by the sound emitted from the loud speaker 53.

We have found that certain characteristic types of wave forms encountered in the use of the apparatus produce characteristic types of sounds from the loud speaker so that an experienced diagnostician who is also experienced in the use of our instrument is capable of making a fairly accurate diagnosis and is capable of following the course of a patient's recovery solely from observation of the meter 58 and by listening to the characteristic sounds which are produced by the loud speaker 53.

In the interest, however, of providing a more accurate analysis of the wave form of the detected potentials and for providing a permanent record of the observed conditions, we employ a cathode ray tube type of oscilloscope including a cathode ray tube indicated diagrammatically in Fig. 2 by the reference character 65. In showing the cathode ray tube 65 in Fig. 2, we have shown only the deflecting plates thereof. The remainder of the elements of the tube are to be connected in the usual and well understood manner to suitable sources of operating potential.

The output of the push-pull amplifier 46 is connected as by means of conductors 66 and 67 to opposite ends of a voltage divider circuit comprising resistances 68, 69, 70 and 71, the common point between resistances 69 and 70 being grounded and being connected also to one deflection plate of the cathode ray tube 65. As will be explained hereinafter the other deflection plate of that pair is connected to a source of sweep voltage.

The ends of the resistance 68 are connected respectively to two switch terminals of a single pole double throw switch 72, the arm thereof being connected to one of the vertical deflection plates of the cathode ray tube 65. In a similar circuit, the ends of the resistance 71 are connected to the two terminals of the second pole of the double pole double throw switch 72, the movable arm thereof being connected to the other vertical deflection plate of the cathode ray tube 65.

The circuit just described applies to the vertical deflection plates of the cathode ray tube 65 the output signal from the push-pull amplifier 46. The magnitude of this signal is controlled by moving the switch 72 between its two positions, full voltage being applied with the switch in the position shown in the drawing and a materially smaller voltage being applied when the switch is thrown to its alternate position. The signal thus applied to the cathode ray tube 65 causes the cathode ray spot on the screen thereof to vary its position vertically in accordance with the variations in the potential picked up by the electrodes 6 and 7.

In order that the cathode ray spot may trace on the screen of the cathode ray tube a representation of the wave form of the detected potentials, we provide a time base sweep circuit for moving the cathode ray spot horizontally as a function of time. To this end, we apply to the ungrounded horizontal deflection plate of the cathode ray tube a sweep signal of saw-tooth wave form. This signal is derived from the alternate charging and discharging of a condenser 73, one terminal of which is connected to the ungrounded horizontal deflection plate and the other terminal of which is connected to a suitable source of positive operating potential. The alternate charging and discharging of the condenser 73 is controlled respectively by a constant current pentode amplifier tube 74 and a gas discharge tube 75 of the thyratron type. The repetition rate of the charge and discharge cycles is controlled by a multi-vibrator employing triode tubes 76 and 77, connected in a conventional multi-vibrator circuit. To this end the cathodes of the tubes 76 and 77 are interconnected and connected as by means of a conductor 78 to the negative terminal of the power supply unit 37a, such connection being represented in Fig. 2 by the arrowhead bearing the legend "—".

The grids of each of the tubes 76 and 77 are returned to the cathodes through grid coupling resistances 79 and 80 and are cross connected to the plate of the companion tube as by means of condensers 81 and 82. The plate of the tube 76 is connected to a load resistance 83, the other end of which is grounded as indicated at 84. Similarly, the plate load for the tube 77 comprises a resistance 85, the other end of which is connected to one terminal 86 of the camera synchronizing switch 19 (referred to in the description of Fig. 1).

The switch 19 comprises a single pole double throw switch, the movable arm of the switch being grounded as indicated at 87 so that with the switch in its normal position as shown in Fig. 2, the plate of the tube 77 is connected to ground through the plate load of resistance 85. It will be appreciated that the grounding of the plate load resistances 83 and 85 applies to the plates of the tubes 76 and 77, a direct operating potential which is positive with respect to the potential of the cathodes of these tubes, the cathodes of the tubes 76 and 77 being connected to a suitable source of negative operating potential as before described.

The output signal from the multi-vibrator 76—77 is coupled through a coupling condenser 88 and grid resistance 89 to the control grid of the gas discharge tube 75. Preferably, the point of common connection between the condenser 88 and resistance 89 is connected to the cathodes of the tubes 76 and 77 through a grid return resistance 90. The signal which is by this means applied to the grid of the gas discharge tube 75 is of the "pip" type, comprising a series of very short positive pulses spaced in time in accordance with the operating frequency of the multi-vibrator 76—77.

The gas discharge tube 75 is arranged with its cathode and screen grid interconnected and connected also as by means of a conductor 91 to the ungrounded horizontal deflection plate of the cathode ray tube 65. The plate of the gas discharge tube 75 is connected through a plate load resistance 92 to the positive terminal of the power supply unit 37a.

The cathode of the gas discharge tube 75 is also connected as indicated at 93 to the plate of the constant current pentode 74. The screen grid of the constant current pentode 74 is preferably grounded as indicated at 94 and the suppressor grid is connected to the cathode as shown at 95. The cathode of the tube 74 is connected through a cathode resistance 96 to one terminal 97 of a tap switch indicated generally at 98, the movable arm of the tap switch 98 being connected as indicated at 99 to the aforementioned source of negative operating potential. Between the individual switch contacts of the tap switch 98 we connect resistances 100, 101 and 102 so that by moving the tap switch to successive positions, additional resistance may be inserted between the source of negative potential and the cathode of the tube 74. This similarly adjusts the magnitude of the plate current which is drawn by the tube 74.

The operation of the charging and discharging circuit for the condenser 73 may be best understood by considering the apparatus to be placed in operation at a time when the condenser 73 is discharged, that is, when both terminals thereof are substantially at the positive potential applied to the upper side of the condenser from the power supply unit. This, of course, applies a positive potential to the plate of the constant current pentode 74 with the result that pentode 74 draws plate current. The current thus drawn is stored in the condenser 73 with the result that the plate of the pentode 74 and the ungrounded horizontal deflection plate of the cathode ray tube 65 gradually shifts in the negative direction. The rate of this shift is determined by the capacity of the condenser 73 and the setting of the tap switch 98. While this charging of the condenser 73 is taking place and after a suitable time has elapsed, the multi-vibrator 76—77 applies to the grid of the gas discharge tube 75 a short duration positive pulse which serves to trigger the gas discharge tube and render the same conductive. This establishes a relatively low resistance shunt circuit across the terminals of the condenser 73, this circuit being traced through the plate load resistance 92 and through the gas discharge tube 75. This serves to abruptly discharge the condenser 73, and when the condenser 73 is nearly discharged the voltage differential across the gas discharge tube 75 becomes so low that it will no longer support a discharge, whereupon the gas discharge tube 75 restores itself to its normal or open circuit condition. At this time the charging of the condenser 73 begins in the manner hereinbefore described.

It will be appreciated that the rate of travel of the cathode ray spot horizontally across the screen of the cathode ray tube 65 is controlled by the rate at which the condenser 73 is charged and this is subject to adjustment by means of the tap switch 98. The maximum frequency with which the cathode ray spot traverses the screen of the tube 65, that is, the repetition rate of the sweep cycle, is determined entirely by the frequency of the multi-vibrator 76—77, while the minimum repetition rate is established by the time required for the sweep circuit to go through one cycle at the lowest sweep velocity setting. While it is entirely feasible and possible to provide an adjustment for the frequency generated by the multi-vibrator we prefer to use a very low fixed multi-vibrator frequency such as approximately four cycles per second. By this means we are permitted to use sweep velocities ranging from that requiring four seconds for the spot to traverse the entire face of the cathode ray tube screen 12, to velocities of as much as four hundred times the lowest value.

It is preferred to keep the repetition rate low because the detected potentials are not recurrent and are more of the nature of transients. By choosing a repetition rate as low as four per second, it is possible to observe the individual traces without having the wave form of the individual traces obscured by the overlapping of successive traces.

Whenever it is desired to make a permanent record of the trace appearing on the screen 12 of the oscilloscope, use is made of the photographic camera 15. In using the camera 15, the switch and shutter mechanism is preferably actuated by an ordinary shutter cable release. The mechanism operates both the shutter and the sequence switch.

The details of one form of the sequence switch 19 are perhaps best shown in Figs. 3 and 4. As shown therein, the switch 19 comprises a housing 103 formed of insulating material and secured to a clamping band 104 by means of which the housing 103 may be secured to the lens barrel of the camera 15. The housing 103 defines an interior space 105 within which are secured a pair of contact springs 106 and 107, the spring 106 forming the aforementioned stationary contact 86 and the spring 107 forming a second stationary contact 108. These springs are preferably secured in any suitable manner to the material of the housing 103 and are formed with bent ends as shown at 86 and 108 to define a space between these bent ends. Within the space so defined there is positioned a switch operator 109 which is secured to a shutter actuating lever 110 (shown in broken lines in Fig. 3) forming a part of the camera shutter mechanism.

When the camera shutter is actuated as by means of the shutter release cable, the shutter actuating lever 110 moves upwardly from the position shown in Fig. 3 to a position disposing the operator 109 in contact with the stationary contact 108.

The point in time with respect to the movement of the shutter actuating lever 110 at which the switch operator 109 engages the stationary contact 108 is adjusted by moving the entire switch assembly 19 around the lens barrel as by loosening the clamp 104 and retightening the clamp when the switch has been moved to its new position. The position of the contact 86 may then be adjusted by means of an adjusting screw 111 threadedly engaged with the material of the housing 103 and arranged to be locked in any position in which it may be placed as by means of a lock nut 112. The inner end of the screw 111 bears against a thrust plate 113 preferably formed of insulating material and disposed in a position to engage the flexible spring 106. It will be seen that by turning the screw 111 to move the same inwardly the spring 106 will be moved from the full line position shown in Fig. 4 toward the dotted line position shown in that figure to thus change the point at which the switch operator 109 engages the stationary contact 86.

As is shown in Fig. 2 the stationary contact 108 is connected to the point of connection common to the condenser 88 and resistance 89 through a coupling condenser 114 which is shunted by a resistance 115. When the switch operator 109 moves out of engagement with the stationary contact 86 the positive operating potential is removed from the tube 77 of the multi-vibrator circuit so as to arrest operation of the multi-vibrator. When, sometime later, the operator 109 contacts the stationary contact 108, the potential of the control grid of the gas discharge tube 75 is abruptly shifted in the positive direction to a value approaching ground potential. This serves to fire the discharge tube 75, discharge the condenser 73, and initiate the charging cycle of the condenser 73, during which time a single trace is produced upon the screen 12 of the cathode ray tube.

By adjusting the position of the switch as hereinbefore described, it is possible to arrange the sequence of operations to be as follows: the multivibrator is stopped, thereby preventing the sweep from being repeatedly triggered; the camera shutter is opened; the sweep is triggered once; the shutter is closed; and the multivibrator is restored to operation giving the repetitive sweep. All of this is accomplished by slowly depressing and then releasing the button on the cable release.

The switch 61 hereinbefore mentioned includes a second pole 118 which is arranged in its second and third positions to connect the power supply unit 37a to a suitable source of alternating current power such as is supplied by the commercial power services.

The switch 61 also includes a third pole 119 which is arranged in its second position to connect a resistance 120 in shunt across the output of the transformer secondary 51. In this same position, the switch arm 60 connects the meter terminal 59 to a conductor 121, which is in turn connected to the movable arm of a potentiometer 122. Potentiometer 122 has both terminals connected to the power supply unit 37a in such wise as to apply across the potentiometer 122 a standard signal of commercial frequency and known voltage. One of the terminals of the potentiometer 122 is also connected to the meter terminal 57. With the switch in the second position as described, one may adjust a variable resistance 123 connected in series with the source of alternating current power so as to produce upon the meter 58 a standard and predetermined reading, the magnitude of which is previously set by adjustment of the potentiometer 122. This adjustment means insures that the apparatus will operate under constant conditions regardless of the voltage of the different alternating current supply systems to which the apparatus may be connected.

We also provide means for adjusting the calibration of the voltmeter 58 and the oscilloscope 65. To this end the switch 25 is inserted between the input filter 24 and the preamplifier stage 30—31. Switch 25 is so arranged that when it is thrown to the position alternate to that shown in Fig. 2, the two input conductors to the tubes 30—31 will be connected to terminals of the power supply unit 37a identified by the letters A and B. These terminals of the power supply unit 37a are energized thereby at the commercial frequency and at a fixed and known potential so that by throwing the switch 25 to its alternate position a signal of known magnitude is applied to the amplifier.

The gain of the amplifier as a whole may then be adjusted to produce upon the screen of the cathode ray tube a standard deflection which corresponds to the desired relation between the calibrating signal and the calibration of the cathode ray tube. Thereafter the gain control device 47 may be adjusted to produce upon the meter 58 the proper deflection.

Following the calibration procedure just described, the switch 25 is returned to the normal position which is shown in Fig. 2, so that intramuscular potentials detected by the electrode probe 9 and surface contact 6 are applied to the oscilloscope 65, to the loud speaker 53, and to the voltmeter 58.

From the foregoing it will be observed that we have provided an electromyograph which is particularly adapted for use in indicating and recording the magnitude and wave form of intramuscular potentials to provide a physician with the necessary information for the proper diagnosis and treatment of the nerve and muscular condition of the patient. It will be observed that we have provided for indicating the magnitude and wave form of the intramuscular potentials by three indicating devices; namely, the oscilloscope, the loud speaker, and the meter; and as has been explained, each of these indications is of particular value to the examining physician.

It will also be observed that we have arranged our apparatus with a recording device in the form of photographic camera and have provided a novel sequence switch for use therewith which insures that the repetitive sweep is stopped and that only one complete trace is presented to the camera during the time that its shutter is held open. The repetitive operation is resumed as soon as the shutter is closed, thus allowing the physician to observe the voltage waves at all times with the possible exception of a few milliseconds required in pressing and releasing the cable release.

Attention is drawn to the fact that this sequence switch works equally well with either a slow or a fast sweep since speed is not a factor in its operation. The order or sequence of events is the factor which it must control.

While we have shown and described the preferred embodiment of our invention, we do not desire to be limited to the details illustrated and described except as defined in the appended claims.

We claim:

1. In an electronic diagnostic instrument for recording electromyograms, the combination of a circuit including an electronic amplifier having muscle tissue connecting means and capable of picking up and amplifying the voltages produced by muscle tissue, a cathode ray tube having a viewing screen, a sweep circuit connected to the cathode ray tube and capable of producing traces across said viewing screen alternately in prompt repetition and also in a single trace, a photographic camera positioned to include said viewing screen in its field of view while leaving the screen in the observer's view, said camera having a shutter operable to permit photographing of said field of view, a switch coupled to said shutter to operate the shutter, an observer-actuated shutter operator to permit the observer to actuate the shutter and photograph the viewing screen at a desired instant, a circuit coupled to said switch to cause the sweep circuit to produce traces across said viewing screen alternately in prompt repetition and singly in proper sequence upon observer actuation of said shutter operator to produce: cessation of the repetitive action of said traces, opening of the camera shutter, production of a single trace, closing of the camera shutter and restoration of the repetitive trace.

2. In an electronic diagnostic instrument for recording electromyograms, the combination of electrodes for picking up muscle voltages, an electronic amplifier connected to said electrodes for amplifying the muscle voltages, a cathode ray tube with a viewing screen connected to said amplifier, a sweep circuit connected to said tube to produce a trace upon said screen, an oscillating circuit coupled to said sweep circuit to trigger it repeatedly, an auxiliary circuit coupled to said sweep circuit to trigger it to produce only a single trace, a photographic camera disposed in spaced relation to the screen and positioned to include said screen in its field of view while leaving the screen in the observer's view, said camera having a shutter, a switch mechanically coupled to said shutter, and circuits connected to said switch and alternately, upon actuation of said shutter and switch, to oscillate said auxiliary circuits and cause, in sequence: repetitive action of said sweep to stop, said camera shutter to open, a single trace to be initiated, said camera shutter to close, and said repetitive sweep action to be restored.

3. In an electronic diagnostic instrument for recording electromyograms, a circuit including an electronic amplifier, a cathode ray tube with a screen connected to said amplifier, a sweep circuit connected to said cathode ray tube and electrically adjustable to operate repeatedly and further adjustable to produce only a single trace on said screen, a photographic camera positioned to photograph the screen and a trace thereon, said camera having a shutter and a shutter actuator, a switch mechanically connected to the shutter actuator and electrically connected to the sweep circuit to alternate it, upon movement of said shutter actuator and switch, from repetitive to single trace operation, and said shutter actuator and switch operating as a unit to produce, in sequence: cessation of repetitive action of said sweep, opening of said camera shutter, triggering of said sweep circuit to produce only a single trace, closing of said camera shutter, and restoration of the repetitive action of said sweep.

References Cited in the file of this patent

UNITED STATES PATENTS

| | | |
|---|---|---|
| 1,736,456 | Matthias | Nov. 19, 1929 |
| 1,954,025 | Reynolds | Apr. 10, 1934 |
| 2,048,013 | Lipp | July 21, 1936 |
| 2,071,370 | Williams et al. | Feb. 23, 1937 |
| 2,109,245 | Zworykin | Feb. 22, 1938 |
| 2,293,784 | Werner | Aug. 25, 1942 |
| 2,477,848 | Borek et al. | Aug. 2, 1949 |
| 2,501,352 | Opsahl | Mar. 21, 1950 |
| 2,504,362 | Verhoeff | Apr. 18, 1950 |
| 2,516,015 | Opsahl | July 18, 1950 |
| 2,628,267 | Stringfield | Feb. 10, 1953 |

FOREIGN PATENTS

| | | |
|---|---|---|
| 429,748 | Great Britain | June 4, 1935 |
| 653,939 | France | Mar. 29, 1929 |
| 772,842 | France | Nov. 7, 1934 |
| 729,004 | France | July 16, 1932 |